No. 689,639. Patented Dec. 24, 1901.
H. G. CORDLEY.
ICE CREAM FREEZER.
(Application filed Jan. 4, 1900.)
(No Model.)
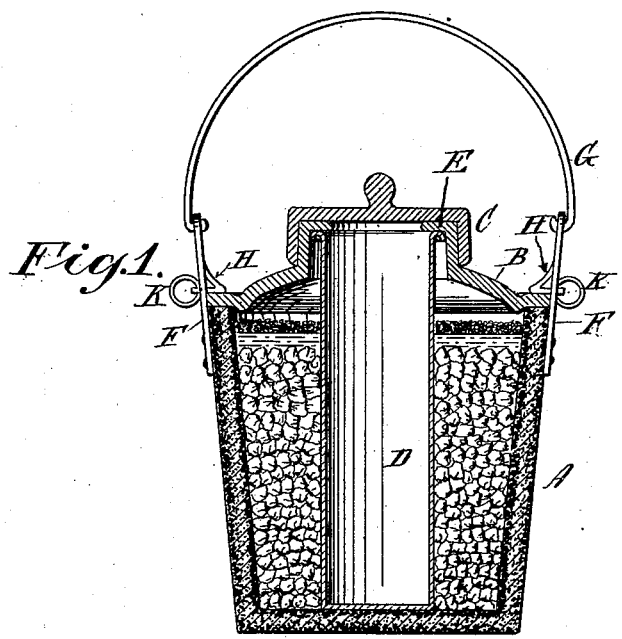
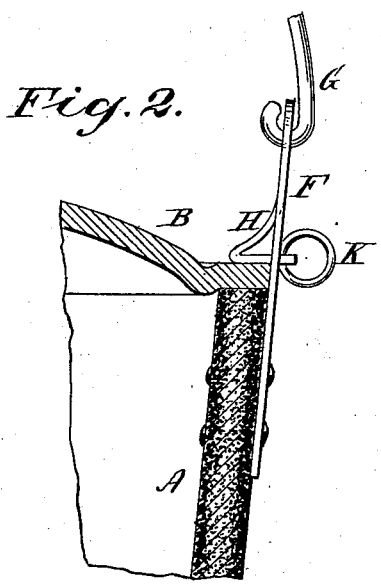
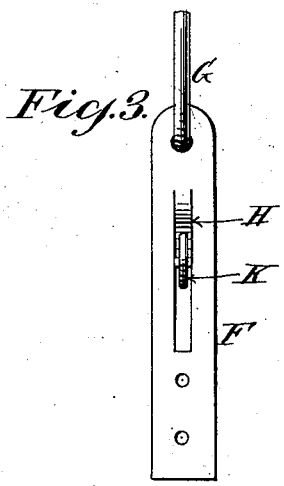
Witnesses:
D. W. Gardner.
L. T. Shaw
Inventor:
Henry G. Cordley
by E. M. Bentley
Atty

UNITED STATES PATENT OFFICE.

HENRY G. CORDLEY, GLENRIDGE, NEW JERSEY.

ICE-CREAM FREEZER.

SPECIFICATION forming part of Letters Patent No. 689,639, dated December 24, 1901.

Application filed January 4, 1900. Serial No. 339. (No model.)

*To all whom it may concern:*

Be it known that I, HENRY G. CORDLEY, a citizen of the United States, residing at Glenridge, county of Essex, and State of New Jersey, have invented certain new and useful Improvements in Ice-Cream Freezers, of which the following is a specification, reference being made to the accompanying drawings, wherein—

Figure 1 is a vertical section of my freezer with the parts in position, and Figs. 2 and 3 are details of the locking device for the cover.

My invention relates to an ice-cream freezer of the type wherein the freezing is accomplished without the usual stirring or agitation by means of internal rotating parts. In this type of apparatus the freezers heretofore in use have ordinarily consisted of an external receptacle, of wood or similar material, provided in some cases with an interior metallic vessel separated by an air-space from the surrounding non-metallic walls of the receptacle. Within this receptacle the ice would be placed, together with a certain amount of brine and salt, and a vessel containing the cream would then be forced down through the ice. This vessel having a broad flange on its upper edge which would rest upon the ice and brine and the flange being also provided with a vertical rim would tend to prevent the salt and ice from coming in contact with the contained cream in the vessel. A single cover would then be provided for the whole apparatus. In my present invention I have aimed to provide a freezer of this type which will be cheaper to construct than those just described and in which there will be no occasion for pressing the cream vessel into the mass of ice within the outer receptacle, (with the consequent danger of damage to the cream-freezer and the difficulty of forcing the vessel through the mass of ice.) I moreover provide means for covering over the ice with a cover that is locked in position, so that it may retain the cool air within the freezer and may also keep the ice in place while the freezer is being transported, while at the same time a second and smaller cover is provided for the cream vessel, to which access may be had through the main cover without exposure of the ice or danger of contaminating the cream with salt water. Moreover, I provide a convenient form of lock for the cover, which serves at the same time as a means for attaching the bail to the freezer.

Referring to the accompanying drawings, A represents a pail or similarly-shaped receptacle, of non-metallic material, such as wood or indurated fiber, which will be a practically non-conductor of heat. I prefer to make the receptacle of extremely thick indurated fiber treated only upon the outer surfaces and to a small depth below the surface, leaving a mass in the center which is softer and more porous, thus containing air and forming a dead-air space. It is thus a better insulator. This form of material is indicated in the drawings. A cover B is made of the same or other suitable non-conducting material or, if desired, of a metallic substance with suitable dead-air space. This cover has a central opening surrounded by a collar E, made slightly tapering and formed in one piece with the cover. The collar projects upward on the outside of the cover and has an inturned lip or flange on its upper end, which serves the double purpose of holding the vessel down and providing means for cleaning the spoon or spatula used with the cream. This cover B fits tightly upon the receptacle A and is held in place by a latch or lock H, formed by making two slits in the bail-plate F, of spring metal, and bending up into the shape of a latch the tongue-piece formed between the two parallel slits. This is shown in detail in Figs. 2 and 3. A ring K is attached to the outer or horizontal portion of latch H, by which it may be pulled outward to release the cover. The bail G is attached to the upper end of the plate F. The vessel for receiving the cream is shown at D as contained within the receptacle A. This will be made of metal, as usual, and its upper edge is turned over to form an inverted-U-shaped flange around its upper outer periphery, which fits tightly into the collar E. A second and smaller cap or cover C fits closely over the collar E and is provided with a suitable handle.

In operation the vessel D will be set in the receptacle A and covered temporarily with the cap C. The space around the vessel will then be filled with cracked ice, nearly to the top of the receptacle A. A suitable amount of brine will then be poured over the ice, and upon this a layer of salt will be placed. Cap C will then be removed and the cover B applied and locked in position, holding the vessel D firmly in place against its floating tendency, when partly full, on the water from the melted ice and effectually preventing the escape of the cool inside air and also the accidental admission of ice or salt to the vessel D. The cream will then be placed in the vessel D and covered with the cap C. The pail may then be set aside, and the cream within the vessel D will become frozen, being, if necessary, occasionally stirred at first by a spatula, from which the cream may be scraped by the overhanging edge on the collar E. It will be observed that the cream is accessible from the outside of the cover B by the removal of cap C, so that it may be introduced into or withdrawn from the vessel D without disturbing the cover B or exposing the ice and salt beneath it. The parts also may be readily molded of indurated fiber at a comparatively small expense, while the only metallic part is the vessel D.

What I claim as new, and desire to secure by Letters Patent, is—

1. In an ice-cream freezer the combination with a vessel containing the material to be frozen of an external receptacle therefor formed of indurated fiber treated on its outer surface but left untreated in the center so as to produce a wall for the receptacle having an interior core of softer or more porous material than that on the surface, a cover for the said receptacle and means for locking the cover in position.

2. In an ice-cream freezer, the combination with an external receptacle, of a cover therefor having a central opening, means for locking the cover on the receptacle, a collar surrounding the said opening and having an inturned flange, and an interior vessel for receiving the material to be frozen projecting through the said opening in the cover and engaging at its upper end the said flange so as to be retained in position by the locking of the cover on the receptacle.

3. In an ice-cream freezer, the combination with an external receptacle, of a cover therefor having a central opening, means for locking the said cover onto the receptacle, a collar on the outside of the cover surrounding the said opening and provided with an inturned flange, a cap embracing the collar to close the opening, and an interior vessel containing the material to be frozen and engaged by the cover so as to be held in place by the locking of the cover on the receptacle.

In witness whereof I have hereunto set my hand, before two subscribing witnesses, this 27th day of December, 1899.

HENRY G. CORDLEY.

Witnesses:
L. T. SHAW,
AN. J. PROVOST.